May 9, 1933.   C. A. BEST   1,908,306
MULTICOLORED GLASS ROD AND METHOD FOR MAKING THE SAME
Filed Nov. 16, 1929   2 Sheets-Sheet 1

INVENTOR
Charles A. Best
By Green & McCallister
His Attorneys

May 9, 1933.  C. A. BEST  1,908,306
MULTICOLORED GLASS ROD AND METHOD FOR MAKING THE SAME
Filed Nov. 16, 1929  2 Sheets-Sheet 2
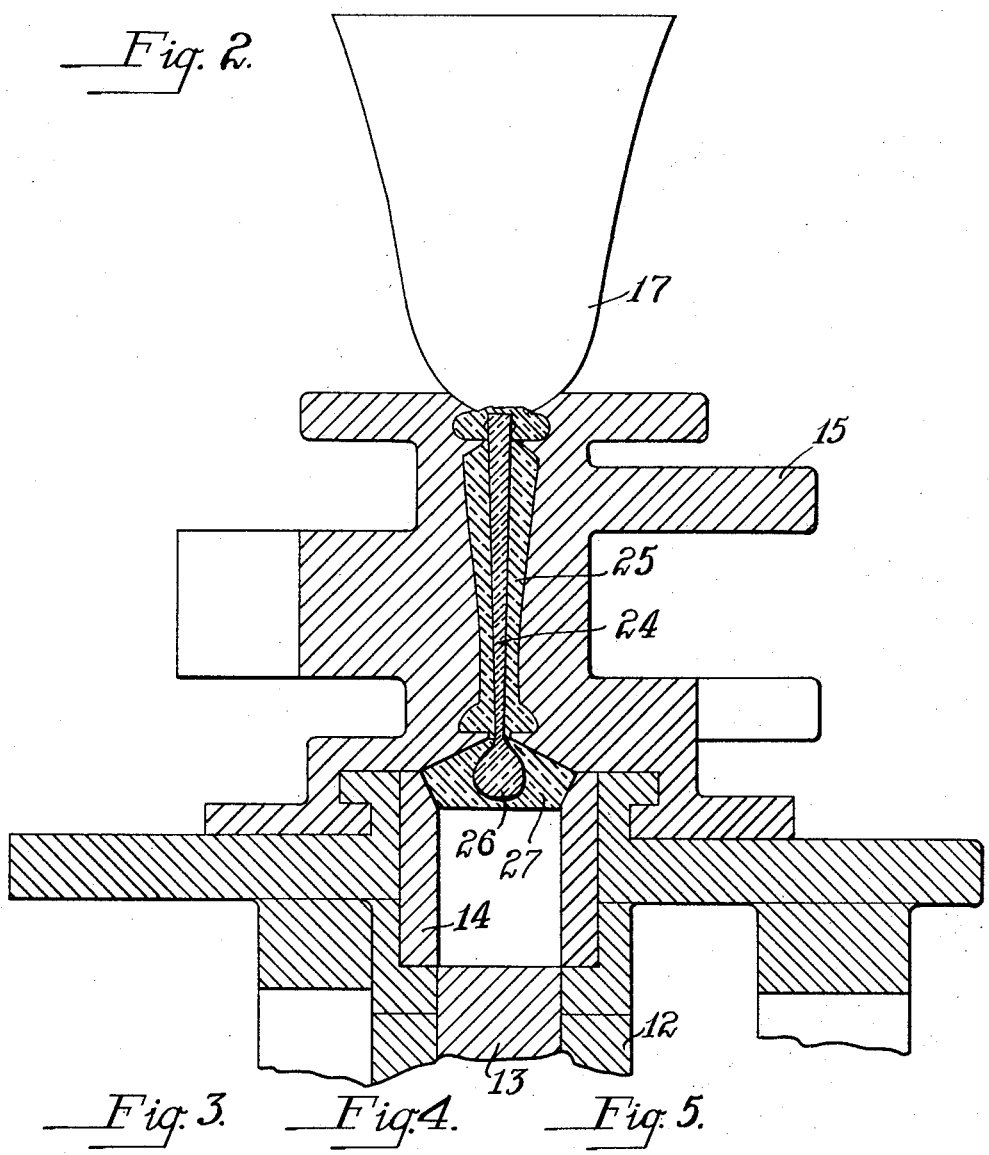

Patented May 9, 1933

1,908,306

UNITED STATES PATENT OFFICE

CHARLES A. BEST, OF MORGANTOWN, WEST VIRGINIA, ASSIGNOR TO MORGANTOWN GLASS WORKS, A CORPORATION OF WEST VIRGINIA

MULTICOLORED GLASS ROD AND METHOD FOR MAKING THE SAME

Application filed November 16, 1929. Serial No. 407,651.

This invention relates to the production of multi-colored glass stems, rods, or the like and to a method and apparatus for manufacturing the same.

It is well known to add elements of suitable characteristics to a glass batch in order to produce tinted or colored glass but so far as I am aware it is new to produce multicolored glass-ware providing one color within or beneath another colored or colorless layer by pressing in suitable machines or apparatus.

One of the objects of the present invention, therefore, is to provide multi-colored glass stems, rods and the like and a method for producing the same.

Another object of the invention is the manipulation of an apparatus containing gobs of molten glass of different color characteristics so as to produce an article having an internal and external glass layer of diverse color characteristics.

A further object of the invention is an arrangement of structural elements enabling the production of such glass-ware in an easy and economical manner.

In general, I provide a receptacle, the bottom of which is at least partially completed by a plunger movable upwardly into said receptacle to force out at the top thereof any material contained therein. The molten glass which is to form the internal colored layer is first disposed on the top of the plunger close to the center thereof and then molten glass of diverse color characteristics is disposed thereupon. When the plunger is raised the first deposited molten glass courses up through the center of the latter deposited molten glass in a totally unexpected manner and with perfect distribution.

According to the accompanying drawings, wherein similar numerals refer to similar parts throughout the several views:

Fig. 2 is an enlarged vertical cross-section through the receptacle and mold disclosing a newly affixed rod or stem; and Figs. 3, 4 and 5 illustrate typical articles which may be formed according to the present invention and the method and apparatus explained hereinafter.

Figure 1:
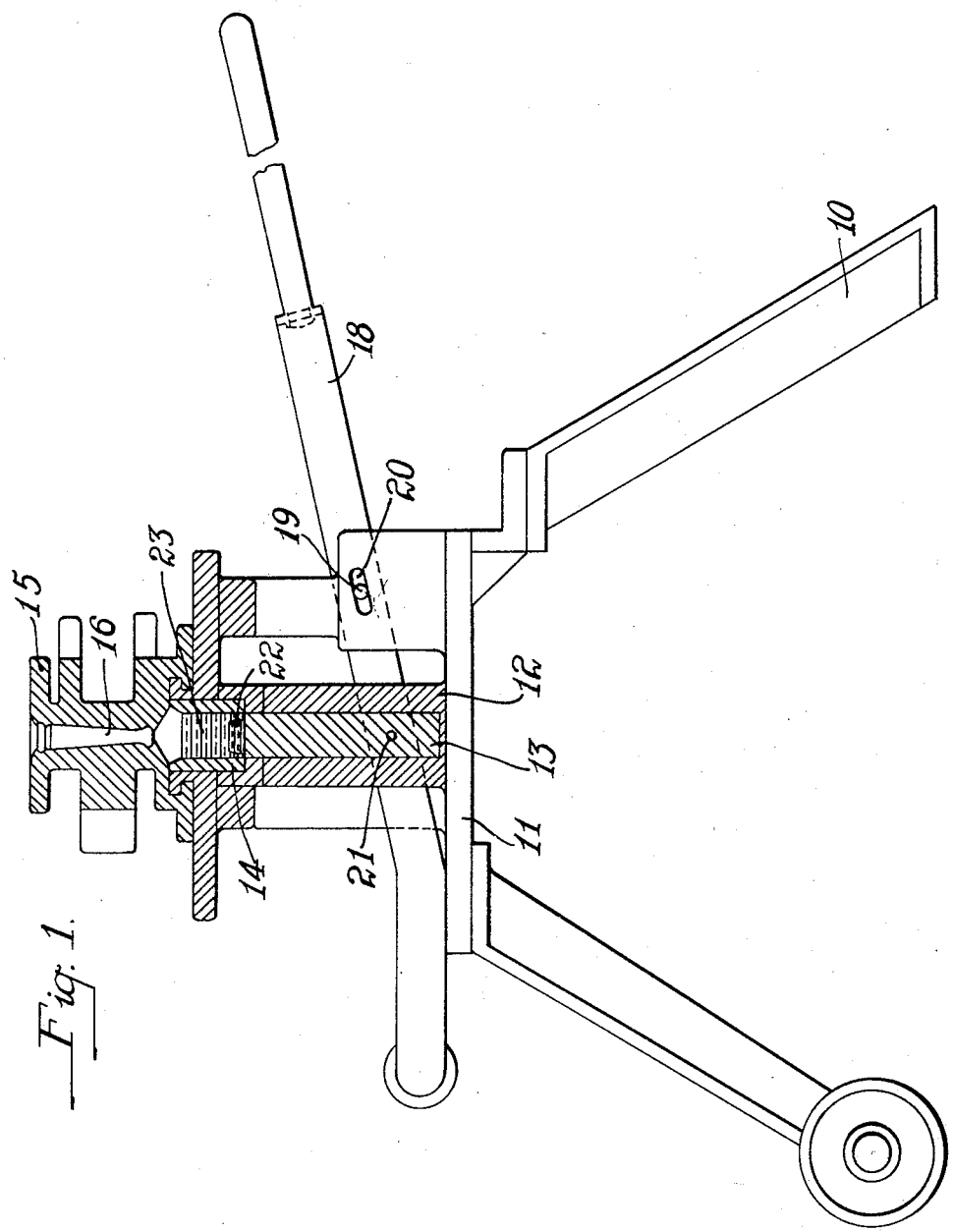
Figure 1 is a partial elevation and partial cross section through an apparatus in which the present invention may be carried out.

The apparatus comprises a support or stand 10 preferably made of cast iron. On a table 11 at the top portion of the stand is a cast iron cylinder 12 which is hollow and in which centrally operates a steel or other metal plunger 13. Immediately above the plunger is a cast iron receptacle 14 adapted to hold molten glass and the receptacle is so constructed and arranged with respect to the plunger that the top of the plunger forms at least a part of the bottom surface of the receptacle.

Superposed above the receptacle 14 and communicating therewith as shown is a suitable mold 15 which may also be of cast iron and said mold is provided with suitably contoured depressions or dies 16 according to the desired kind of ultimate article. In the illustration shown, the mold is one permitting the production of a solid glass stem or rod having an internal colored glass layer contrasting with the outer one. On the top of the mold and communicating with the top of the die may be suitably placed a glass goblet bowl 17, or the like, to which the stem is to be affixed.

In order to operate the plunger 13 in the cylinder 12, a suitable actuating mechanism is provided. This may consist of an operating handle 18 which may have a pin and slot connection 19 and 20 with the frame work of the apparatus. The pin can either be on the handle member or on the frame work and correspondingly the slot may be in the other of the two. The handle may pass through a suitable slot in the cast iron cylinder and plunger and a suitable connection as by a pin 21 is provided between the adjacent portions of the handle and plunger. It is clear that the handle may be bifurcated and it is equally clear that by manipulatnig the handle either by lowering the right-hand end or by raising the left-hand end, about pin 19 as a pivot, see Fig. 1, the plunger may be raised within the cast iron cylinder thus forcing into the mold any materials deposited in the receptacle, of which as has already been stated, the plunger forms at least a portion of the bottom surface.

In operation, as will be seen from Fig. 1, a gob or portion of molten glass 22 of a predetermined color characteristic is first deposited on the top of the plunger substantially centrally thereof, which material is subsequently to constitute the internal layer in the completed article. On top of and around the first gob of molten glass is deposited a second gob or portion of molten glass 23 of relatively greater amount. The second gob of molten glass may either be colorless or may be of some color contrasting with the color of the first gob of glass and forms the external layer of the stem or rod.

As is known, molten glass in proper condition for use in glass molding is very viscous and the greater gob of glass will chill to some extent at its outer surfaces, such as those surfaces in contact with the sides of the receptacle and with the air in the space thereabove but the interior remains hot. The smaller gob of first deposited glass is, however, maintained comparatively hot by the second deposited gob of molten glass. When the plunger is operated so as to raise it and force the materials in the receptacle up into the mold, the way or course being unobstructed from the top of the plunger to the bottom of the glass goblet bowl, the large gob of the second deposited glass follows up substantially along the walls of the receptacle and then of the mold, whereas the first deposited gob of glass courses up through the hot center of the second deposited glass which is thus forced to the walls, as particularly shown in Fig. 2, wherein the plunger has been raised to force the material up into the mold and into contact with the bottom of the glass goblet 17, the plunger subsequently having been again lowered.

In Fig. 2, the gobs of molten glass are shown formed into layers 24 and 25, corresponding to the gobs 22 and 23 of Fig. 1. These layers are affixed, as by fusion or the like, to the bottom of goblet bowl 17. At the lower end of layer 24, a bulb of glass 26 may remain, unless removed, and this bulb eventually becomes an internal part of the base of the goblet, not shown, which may be provided in any known manner, adding to the effect. The bulb 26, while excess material in some respects, prevents undue strains in the finished article and hence is of advantage. The surplus or press-over 27 similarly results from layer 25 and may be utilized or removed as desired.

As seen from Figure 2, the plunger 13 may be disposed for an incomplete exhaustion of molten glass from the receptacle 14, in order that the glass forced into the mold 15 may have an over-press lower or bottom portion 27. This portion 27 may be utilized as an attaching means for connecting the stem 24 to any suitable form of base such as shown in Figs. 3, 4, and 5. The contour of the upper portion of the receptacle 14 may be designed with the above purpose in mind; in the embodiment of Figure 2, outwardly and upwardly sloping sides are illustrated.

The action is as unexpected as it is perfect and in practice very unusual and attractive results are attained with great simplicity and economy. By properly shaping the mold any desired type or configuration of stem can be produced and I am particularly able to produce stems either of a multi-colored single column as shown in Fig. 3, of a multiplicity of multi-colored columns as shown in Fig. 4, or a multi-colored branched column or columns as shown in Fig. 5, as to the first embodiment of the two.

I am not precluded from forming these multi-colored glass rods from the top instead of from the bottom, if I so desire, but the preferred and simplest manner is to form them from the bottom as above described. In forming the rods from the top, I may proceed in various manners depending on circumstances. For example, I may press the molten glass downwardly by pressure exerted above the mold or through the mold, say near the top thereof, or, by applying suction below the mold or near the bottom of the mold, I may draw the glass downwardly. The base and goblet will still be formed or affixed substantially as hereinabove set forth.

What ever the number or shape of the columns, each column or branch of a column consists of an internal layer and an external layer, the two layers being of contrasting or diverse color characteristics. It is clear that either of the layers can be colorless or only slightly colored and that the other layer can be appropriately colored to any desired degree and extent not only as to the color itself but as to its depth or intensity.

I can, in addition provide stems of various contours either by appropriately configuring the internal surface of the mold or by twisting or turning the stem and goblet or base relatively before the former has completely hardened to a brittle state or by thereafter softening and twisting the same. In this way I may provide a column consisting of a multiplicity of twisted columns or one or many spirally arranged or offset columns.

It will be clear to those familiar with the art that when I speak of "layer", I mean layer as shown by color diversification. This is true since, if two simultaneously formed molten gobs are made of the same batch and are cooled or "set" together, the cross-section of the glass need not necessarily show textural layers.

There are many variations and modifications of stems which can be made according to the present invention without departing from the scope thereof and it is to be understood that the illustrated forms are merely exemplary of some forms readily produced by my invention.

What I claim as new and desire to secure by Letters Patent is:

1. The method of making multi-colored glass stems including the steps of causing a gob of molten glass of one color to course through a gob of molten glass of another color.

2. The method of making multi-colored glass rods including the steps of causing a gob of molten glass of one color to course through the center of molten glass of another color.

3. The method of making multi-colored glass rods including the steps of depositing gobs of diversely colored glass, causing said gobs to flow into a mold, and substantially simultaneously causing one of said gobs to course through the other.

4. The method of making multi-colored glass rods including the steps of depositing a plurality of gobs of molten glass of diverse color characteristics in a receptacle, causing said gobs to pass into a mold and one of said gobs to course through the other, and completing said rods.

5. The method of making multi-colored multi-layered glass articles consisting in depositing a plurality of gobs of molten glass of diverse color characteristics in a receptacle in substantially superposed position, and causing said layers to pass into a mold and said lowermost layer to course through said uppermost layer which tends to seek a relatively outer position.

6. The method of making multi-colored glass rods including the steps of depositing a gob of glass on a plunger, depositing a second gob of glass of diverse color characteristics on said first gob, causing said gobs to enter a mold and conform thereto, substantially simultaneously causing said first gob to course through the center of the second, and completing said rods.

7. The method of making multi-colored glass rods including the steps of depositing a gob of molten glass centrally on top of a plunger completing the bottom of a receptacle, depositing a second gob of molten glass of diverse color characteristics on said first gob, operating said plunger to cause said gobs to enter into and conform to a mold, said first gob substantially simultaneously coursing through the center of the second, and finishing said rod.

8. The method of making multi-colored rod-like glass articles in which the article is formed from two diversely colored charges of plastic glass and in which glass from one charge is enveloped by glass from the other in the finished article, which consists in partially enveloping a charge of plastic glass by means of a second charge of plastic glass of diverse color characteristics, chilling a relatively large portion of the surface of the enveloping charge to slightly reduce the surface plasticity of such charge while maintaining the plasticity of the surface of the enveloped charge in contact with the enveloping charge, and then simultaneously forcing both charges into a forming device so that the partially enveloped charge is directly subjected to the moving force and is extruded, in the direction of said force through the interior of the enveloping charge.

9. The method of making multi-colored glass rods which includes the step of coursing molten glass of one color in a predetermined direction and relationship through molten glass of another color.

10. The method of making multi-colored glass rods which includes the steps of coursing diversely colored molten glass in accordance with the color thereof in a predetermined relationship within itself, and of allowing the molten glass to set in such relationship.

11. The method of making a multi-colored glass rod including the steps of depositing a gob of glass on a plunger, depositing a second gob of glass of diverse color characteristics on said first gob, causing one of said gobs to take on the configuration of a mold by causing it to enter the same and substantially simultaneously causing the other gob to course through the center of the first and to form a layer relatively internal thereto.

12. The method of making a multi-colored glass rod including the steps of depositing a gob of glass on a plunger, depositing a second gob of glass of diverse color characteristics on said first gob, causing one of said gobs to take on the configuration of a mold by causing it to enter the same and substantially simultaneously causing the other gob to course through the center of the first and to form a layer relatively internal thereto, and imparting additional physical configurations to said rod.

In testimony whereof, I have hereunto subscribed my name this 9th day of November 1929.

CHARLES A. BEST.